J. COLES.
WEEDING-PLOW.
No. 193,225. Patented July 17, 1877.
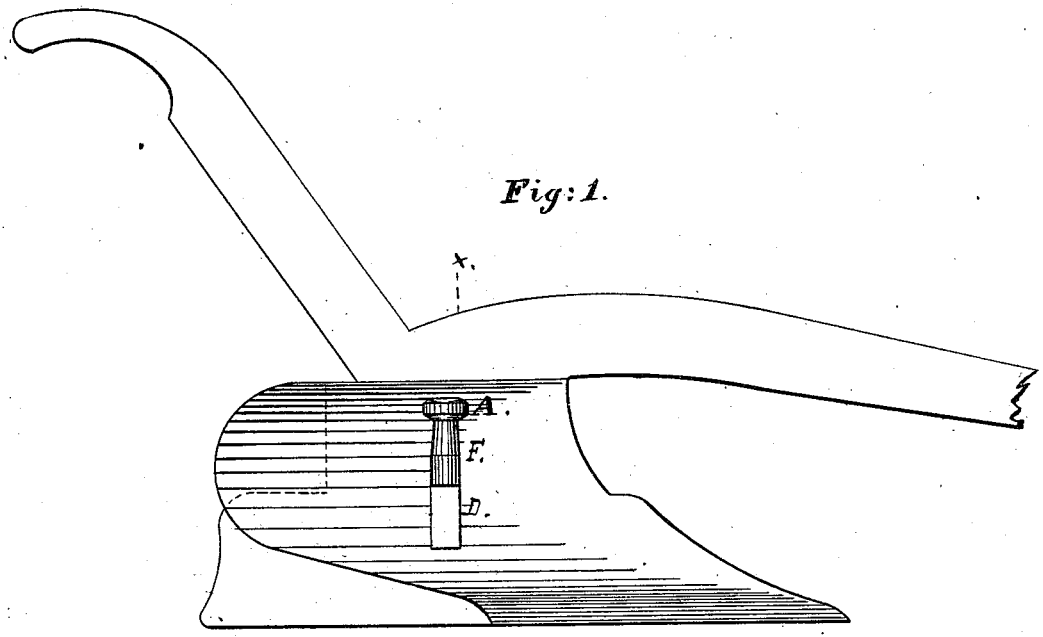
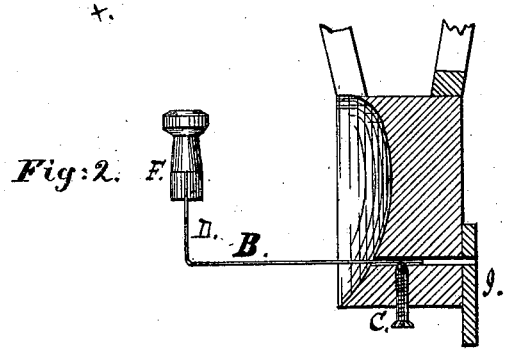
Witnesses:
A L Cross
John Sparks
Inventor:
James Coles
By Horace Harris
Atty

UNITED STATES PATENT OFFICE.

JAMES COLES, OF MILBURN, ASSIGNOR OF ONE-HALF HIS RIGHT TO DAVID B. COLES, OF MOUNT OLIVE, NEW JERSEY.

IMPROVEMENT IN WEEDING-PLOWS.

Specification forming part of Letters Patent No. 193,225, dated July 17, 1877; application filed April 25, 1877.

*To all whom it may concern:*

Be it known that I, JAMES COLES, of Milburn, in the county of Essex and State of New Jersey, have invented a new and useful Improvement in Weeding-Plows, which improvement is fully set forth in the following specification and accompanying drawings, in which—

Figure 1 is a side elevation; and Fig. 2, a cross-section on the line $x\ x$, Fig. 1.

The object of my invention is to attach to a plow to be used in weeding corn or other plants a cutter that shall effectually destroy most of the weeds that ordinarily require a hoe to exterminate. I also attach to the weeding apparatus an index-guard, to prevent the liability of cutting off the plants which are being cultivated.

To the mold-board A of a plow is attached a horizontal cutter, B, which is made fast by having the inner end inserted through a slot-hole in the mold-board and inside of the plow. It is held by a plate and screw, C, or by some other suitable mechanism.

The manner of holding is not a part of the invention, only the general order is maintained.

The cutter is made to work just below the surface of the soil—say, one inch—and working at that level, it will cut the weeds off at their junction with the roots, and leave them to die.

In some instances it will be desirable to attach the cutter to the land-side I of the plow, in which case it is detached from its present position and secured on the land-side in the same way. The cutter is made reversible.

To the outer end of the cutter is secured a guard, D, standing vertically at right angles with the cutter. This guard is made long enough to come up to a little above the top of the weeds, and terminates with a showy top, F, so that the operator will be able readily to see how wide the cutter is working, and not be liable to cut the plants while he desires to cut the weeds only; and for this reason the guard is an important part of the invention; therefore,

What I claim as my invention, and desire to secure by Letters Patent, is—

The cutter B, having the guard D, in combination with a plow, substantially as and for the purposes specified.

JAMES COLES.

Witnesses:
 HORACE HARRIS,
 DAVID B. COLES.